US008405786B2

(12) United States Patent
Mellor

(10) Patent No.: US 8,405,786 B2
(45) Date of Patent: Mar. 26, 2013

(54) RADIATION MEASUREMENT

(75) Inventor: Matthew Paul Mellor, Whitehaven (GB)

(73) Assignee: Create Technologies Limited, Cleartor Moor, Cumbria (GB)

( * ) Notice: Subject to any disclaimer, the term of this patent is extended or adjusted under 35 U.S.C. 154(b) by 1037 days.

(21) Appl. No.: 12/442,567

(22) PCT Filed: Sep. 26, 2007

(86) PCT No.: PCT/GB2007/003658
§ 371 (c)(1),
(2), (4) Date: Mar. 24, 2009

(87) PCT Pub. No.: WO2008/037988
PCT Pub. Date: Apr. 3, 2008

(65) Prior Publication Data
US 2010/0045777 A1    Feb. 25, 2010

(30) Foreign Application Priority Data
Sep. 27, 2006   (GB) .................................. 0619145.6

(51) Int. Cl.
*H04N 9/24* (2006.01)
(52) U.S. Cl. ................. 348/819; 588/4; 348/42
(58) Field of Classification Search .................... 348/819
See application file for complete search history.

(56) References Cited

U.S. PATENT DOCUMENTS 5,323,011 A * 6/1994 Suter et al. ................. 250/474.1
6,782,123 B1 * 8/2004 Guillon et al. ................. 382/154
2004/0037394 A1 * 2/2004 Kuroda et al. ................. 378/205
2004/0211912 A1 * 10/2004 Lightfoot et al. ............. 250/394

FOREIGN PATENT DOCUMENTS
FR    2 759 791    8/1998

OTHER PUBLICATIONS

Twardowski et al, "The Development of a Computer Code for Estimating Radiation Source Terms", IMechE 1992; C436/031.
Bennett, "Application of a Computer Code 'Domain' for Dose Management and ALARP in decommissioning", Nuclear Decom '92, Decommissioning of Radioactive Facilities (Proc. Int. Conf. London, 1992), Mechanical Engineering Publications, London (1992).

(Continued)

Primary Examiner — Jude Jean Gilles
Assistant Examiner — Jaren M Means
(74) Attorney, Agent, or Firm — Nixon & Vanderhye P.C.

(57) ABSTRACT

A method of determining the distribution of radioactive material within a region is described. A plurality of radiological measurements and associated geometrical measurements taken at a plurality of positions in said region are input to a computer system. A 3D model of structures within said region is defined and the position within the model of each radiation measurement is obtained by using the geometrical measurements. The radiological measurements are then ascribed to a distribution of sources restricted to defined locations in the 3D model. The source distribution is parameterized over the defined source locations, and each parameter is related to the calculated observable radiation field, calculated using a physical model, at each measurement position. The parameters are adjusted to optimize the correspondence between the actual radiological measurements and the calculated observable radiation field, to yield the distribution of radioactive material as defined by the adjusted parameters.

15 Claims, 4 Drawing Sheets

OTHER PUBLICATIONS

Brooks et al, "Principles of Computer Assisted Tomography (CAT) in Radiographic and Radioisotopic Imaging", Physics Inmedicine and Biology, Taylor and Francis Ltd., London, GB, vol. 21, No. 5, Jan. 1, 1976, pp. 689-732.

International Search Report for PCT/GB2007/003658, mailed Jan. 28, 2008.

Written Opinion of the International Searching Authority for PCT/GB2007/003658, mailed Jan. 28, 2008.

* cited by examiner $$F = \begin{bmatrix} K/d11^2, & K/d12^2, & K/d13^2 \\ K/d21^2, & K/d22^2, & K/d23^2 \\ K/d31^2, & K/d32^2, & K/d33^2 \\ K/d41^2, & K/d42^2, & K/d43^2 \\ K/d51^2, & K/d52^2, & K/d53^2 \\ K/d61^2, & K/d42^2, & K/d43^2 \\ K/d71^2, & K/d72^2, & K/d73^2 \\ K/d81^2, & K/d82^2, & K/d83^2 \end{bmatrix}^T \quad S = \begin{bmatrix} s1 \\ s2 \\ s3 \\ s4 \\ s5 \\ s6 \\ s7 \\ s8 \end{bmatrix} \quad R = \begin{bmatrix} r1 \\ r2 \\ r3 \end{bmatrix}$$

RADIATION MEASUREMENT

This application is the U.S. national phase of International Application No. PCT/GB2007/003658, filed 26 Sep. 2007, which designated the U.S. and claims priority to Great Britain Application No. 0619145.6, filed 27 Sep. 2006, the entire contents of each of which are hereby incorporated by reference.

This invention relates to a method for determining the distribution of radioactive material within a region, such as a nuclear facility, and optionally to determining the composition of the material and the radiation field associated with it.

When operating or decommissioning facilities containing radioactive nuclear materials, it is frequently necessary to understand the quantity and distribution of radioactive material within the plant, its isotopic composition, and the associated radiation field. There may also be a requirement to understand other properties of the facility, such as physical size and shape.

Conventional methods to provide this information are expensive and time consuming, and require the deployment of bulky equipment. In many circumstances, such as initial plant investigations, such methods may not be justifiable, and more straightforward methods are employed, but the information gained is less precise.

It is an object of the invention to alleviate, at least partially, some or any of these problems.

Accordingly the present invention provides a method of determining the distribution of radioactive material within a region comprising:

inputting a plurality of radiological measurements and associated geometrical measurements taken at a plurality of positions in said region;

defining a 3D model of structures within said region;

obtaining the position within the model of each radiation measurement by using the geometrical measurements;

ascribing the radiological measurements to a distribution of sources restricted to defined locations in the 3D model;

parameterising the source distribution over the defined source locations;

relating each parameter to the calculated observable radiation field, calculated using a physical model, at each measurement position;

adjusting the parameters to optimize the correspondence between the actual radiological measurements and the calculated observable radiation field, to yield the distribution of radioactive material as defined by the adjusted parameters.

The present invention provides a way to greatly improve the quality of information available through simple and cost effective survey techniques, by combining both radiological and geometrical information. Specifically, it proposes a method and apparatus to measure the radiological and geometrical properties of a facility and a method to process this information as a whole to estimate the distribution and composition of radioactive material and the resulting radiation field.

The measurement of radiological and geometrical data is achieved using a combination of two measurement devices. The geometrical measurement device preferably produces both measurements of a facility and of its own position within the facility. Examples of such devices are conventional cameras and laser scanners. Most gamma, neutron and beta radiation measuring devices may be used. The radiation measuring device is used to take a series of measurements of the radiation field at locations that have been measured with the geometrical measurement device. This may be conveniently achieved, for example, by physically attaching the two measurement devices. The output of this measurement process is a three-dimensional (3D) model of the facility, a series of measurements of the radiation field, and a coordinate (and possibly orientation) that describes the location of each radiation measurement within the model.

The second stage of the process comprises a method for estimating the source distribution. First, an assumption is made about the distribution of the radiation sources that restricts their locations within the 3D model. For example, it may be assumed that all sources lie on exterior surfaces. Next a parameterisation of the source distribution over the allowed source locations is generated. A physical model is then used to calculate the effect of each parameter on each radiation measurement point. Since the combined effect of each parameter must give the observed radiation field at each point, this enables a series of equations to be written which relate the parameters to the radiation field measurements. Typically, there will be far more parameters in the model than individual measurements taken and it is therefore not possible to 'solve' for the parameters. Instead, an additional assumption must be made, which enables selection of the 'best' or 'most probable' set of parameters from all of the possible sets of values which would be compatible with the observed measurements. As an example, one such assumption would be that the 'best parameter values' are the ones which correspond to the least amount of radioactive material. The output of this process is a parameterised model of the source distribution and the set of 'best parameters', which together define the estimate of the source distribution field.

The optional final stage in the process is to calculate the radiation field. This is derived using the same process that was used to relate the parameters to the radiation measurements; a set of equations may be written for each point in space, enabling the total radiation field at that point to be computed. This may be done for every point in space, providing a method to estimate the entire radiation field. For a suitable parameterisation the direction from which the radiation arrives at each point in space may also be calculated.

This invention affords a very efficient method to estimate the radiation source distribution, as it requires no more work on plant than conventional surveys. Other methods typically require expensive and unwieldy apparatus to take collimated measurements of radiation fields. Because this invention estimates the location of all the radioactive material in a facility, it enables a more reliable estimation of the radiation field at most points within a facility than collimated methods which only a sample a particular field of view. In comparison to other non-collimated techniques, the present invention provides significantly greater insight into the form of the radiation field by estimating the source of radiation at each point in space. This enables the effect of shielding to be estimated, which previously was not possible to the same degree of accuracy, and gives an improved estimate of the radiation field at a distance from the measurements.

Embodiments of the invention will now be described, solely by way of example, with reference to the accompanying drawings in which.

Figure 1:
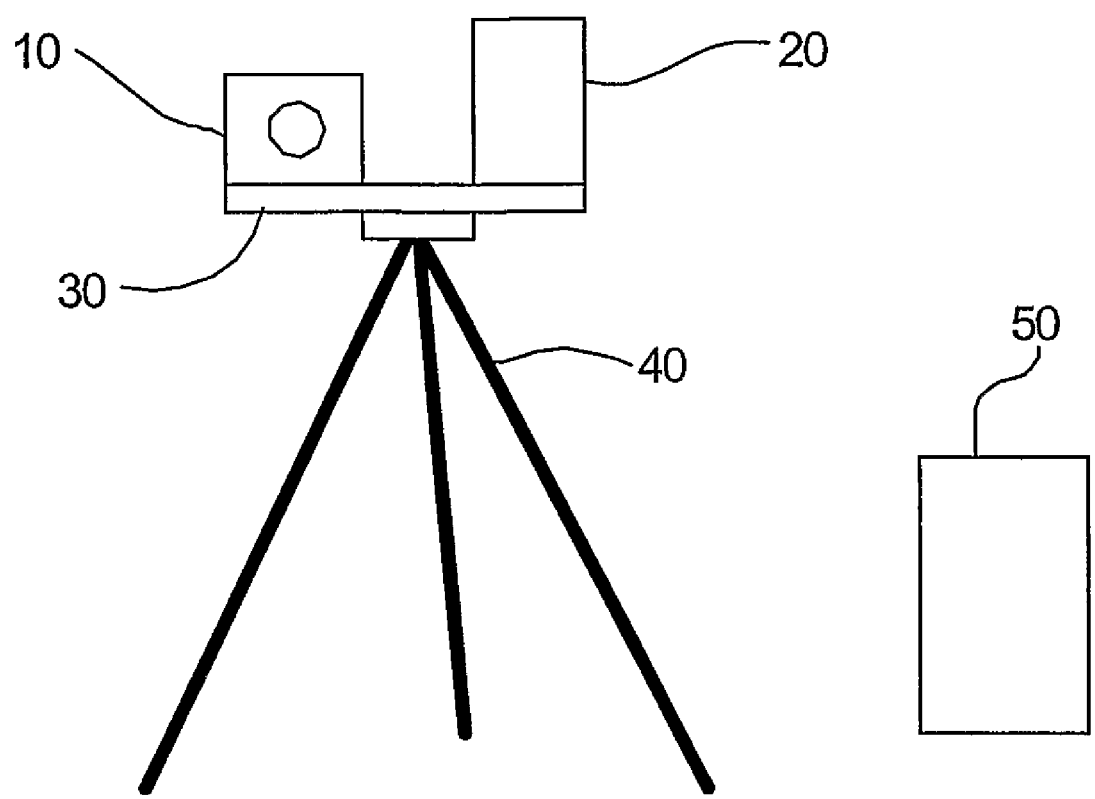
FIG. 1 is a schematic illustration of apparatus according to an embodiment of the invention.

The first embodiment of the invention will now be described. The apparatus is illustrated in FIG. 1 and comprises a conventional photographic camera 10, preferably a digital camera, for example a wide-angle webcam, as the geometrical measurement device, and an un-collimated, total-counts gamma radiation sensor 20 as the radiological measurement device also referred to as the radiation probe. In other embodiments, the radiation sensor may be, for example, an un-collimated total absorbed dose radiation sensor or an un-collimated radiation spectrometer; the radiation detected by the sensor is also not limited to gamma radiation. The sensor 20 and camera 10 are mounted together, e.g. on a frame 30, so that they are fixed relative to each other. This frame 30 may be hand-held or may then be mounted on a tripod 40 if the apparatus is too heavy to operate manually, or if long dwell times are required to obtain accurate readings from the radiation sensor 20.

The apparatus is taken to the facility to be modelled and numerous observations are made, where each observation comprises one photograph and one observed gamma radiation spectrum (or simply radiation dose or number of counts) and each pair of readings are taken from the same position. The facility could be a single room, multiple rooms in a building, the exterior surface of a building, an area of installed equipment within a room, a patch of contaminated land, any combination of these, or indeed any three dimensional environment containing an unknown distribution of radioactive material. The general term "region" is also used to refer to any such facility or space for which it is intended to determine the distribution of radioactive material. The number of readings required will depend upon the layout and size of the facility and the required precision, but might typically be in the range of 50-200 for a small facility. The locations of the readings will be determined so that space within the facility is given approximately even coverage and so that the set of photographs is sufficient to create a 3D model of the facility using photogrammetry techniques. Areas of the facility that are of particular interest may require additional observations to improve the precision of the estimated source distribution.

The readings or observations obtained by the apparatus described above are then processed using a computer system 50 employing the method described in more detail below. The computer system 50 can be dedicated hardware, or can be a standard desktop or laptop computer with suitable interfaces for receiving the data from the camera 10 and sensor 20. In one preferred embodiment, the camera 10 and sensor 20 initially store the data until all the measurements have been made, and then the data are input to the computer system 50 either via a cable for communications or wirelessly. In this case the computer system does not need to be present at the facility, and the data can be processed off-line.

The analysis or processing of the data by the computer system 50 is performed according to a method as described below which can be embodied in software. Such software constitutes a computer program and may be written in any suitable language. The computer program may be stored on a computer-readable medium, which may be of any type, for example: a recording medium, such as a disc-shaped medium insertable into a drive of the computer system, and which may store information magnetically, optically or magneto-optically; or a recording medium of the computer system such as a hard drive or solid-state computer memory, either of which may be removable from the computer system or fixed to the computer system.

Figure 2A:
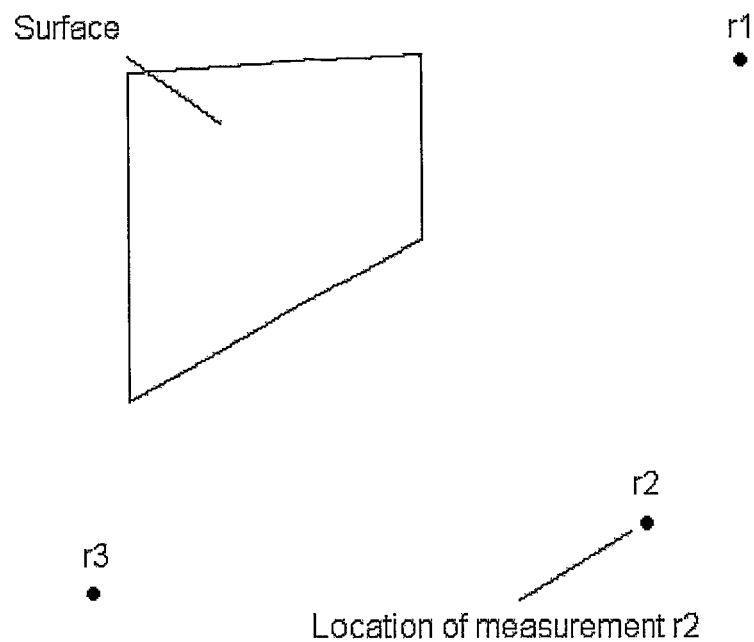
FIG. 2(a) shows a simple model consisting of a single flat surface and locations of three radiation measurements taken near the surface.
Figure 2B:
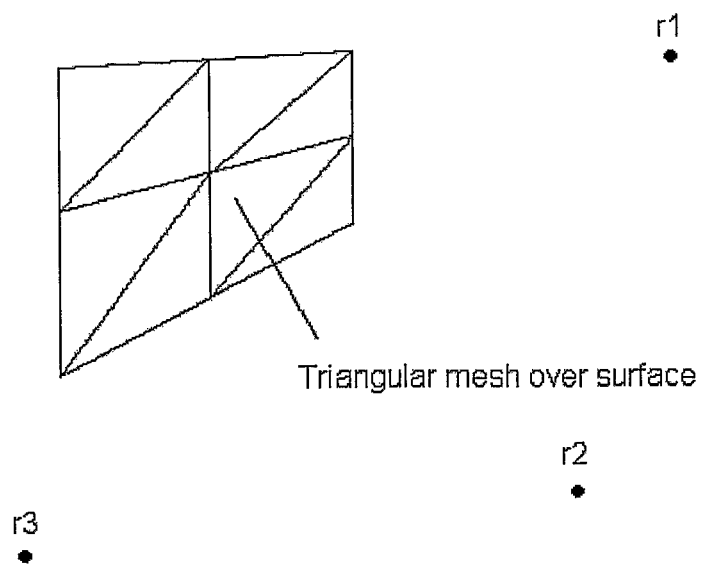
FIG. 2(b) shows how the surface can be subdivided to make a triangular mesh (figure not to scale)

The first step in processing the data is to generate a 3D model of the facility using a combination of photogrammetry techniques and other sources of information such as technical drawings or existing CAD models of the facility. Sections of the model are then identified as potential locations for radiation sources. The simplest choice is to assume that sources are distributed over external surfaces of the model as this minimises the effects of shielding and eliminates the vast majority of potential source locations, improving the output of the process. However, care must be taken to ensure that the assumption made at this point is suitable to facility in question. FIG. 2(a) shows a simple model in which the sources are assumed to lie on a flat plane. The source distribution within the selected region of the model is then parameterised. The choice of parameterisation is arbitrary at this point, provided that it has the following properties. Firstly, the parameterisation should be capable of representing all plausible source distributions to a greater degree of precision than could be solved for given the set of measurements that have been taken. Secondly, the radiation field at all points in space must be a superposition of the radiation field caused by the radiation sources described by each parameter. Mathematically, this condition may be expressed as:

$$R(x, y, z) = \sum_{n=1}^{N} s_n f_n(x, y, z) \ \forall \ x, y, z \qquad \text{Eq. 1}$$

Where R is the intensity of the radiation field at point (x,y,z) and $f_n$ is a function giving the contribution of radiation source parameter $s_n$ at point (x,y,z). There are many choices of parameterisation which satisfy these properties. In the case of surface sources a good parameterisation is to divide the surface into many small triangles, with the amount of source material within each triangle described by a single parameter. The triangles should be small in comparison to the distance between the triangle and the nearest measurement, and preferably close to equilateral in proportion, and may be generated using standard meshing techniques from computer modelling and graphics applications. FIG. 2(b) shows a potential meshing of the simple surface model (note that the figure is not to scale).

In some cases, the simple triangular patch technique will result in a very large number of parameters, resulting in a computationally inefficient model. In these cases, the dimension of the parameterisation can be reduced by linking the values of neighboring triangles. The simplest technique is to assign groups of neighbouring triangles a single radiation source density described by a single parameter. A preferable method, which allows a smoothly varying radiation source distribution is to define the N single triangle radiation source parameters $s_n$ as a weighted sum of a smaller number, M, of multi-triangle parameters $s'_m$. Selecting the weighting functions w(n,m) (known as a basis) is a design issue, and conventional techniques can be used to adapt the choice to a specific mesh.

Once the model is parameterised, the parameter values which generate the observed radiation field with the minimum Root Mean-Square amount of radioactive material are calculated. This assumption tends to produce results which are conservative in terms of the total amount of radioactive material, but prefers distributed sources to point sources, which is suitable for many contaminated facilities. It is emphasised that this is only one of several possible methods of selecting the best set of parameter values, the choice of which will depend on prior knowledge of the facility. This set of parameter values may be found as follows. For each measurement of the radiation field, $r_k$, an equation may be derived from Eq. 1, of the form:

$$r_k = \sum_{n=1}^{N} s_n f_n(x_k, y_k, z_k) \quad \text{Eq. 2}$$

Where $x_k, y_k,$ and $z_k$ are the space coordinates of the measurement. The system of equations generated in this way can be written in matrix form as follows:

$$FS = R \quad \text{Eq. 3}$$

Where F is a matrix, defined as:

$$F_{nk} = f_n(x_k, y_k, z_k) \quad \text{Eq. 4}$$

and S and R are vectors of which the ith elements are $r_i$ and $s_i$ respectively. Typically, the number of parameters, N, and the number of radiation field readings, K, are different. This implies that F is non-square, which in turn implies that it has no inverse and that the system of equations cannot be 'solved'. However, it is nevertheless possible to find the shortest length parameter vector S which generates the observed radiation readings R by finding the pseudo-inverse of F. The pseudo inverse, $F^+$, is a well known tool for solving under and over determined systems of equations, defined as:

$$F^+ = (F^T F)^{-1} F^T \quad \text{Eq. 5}$$

Figure 3:
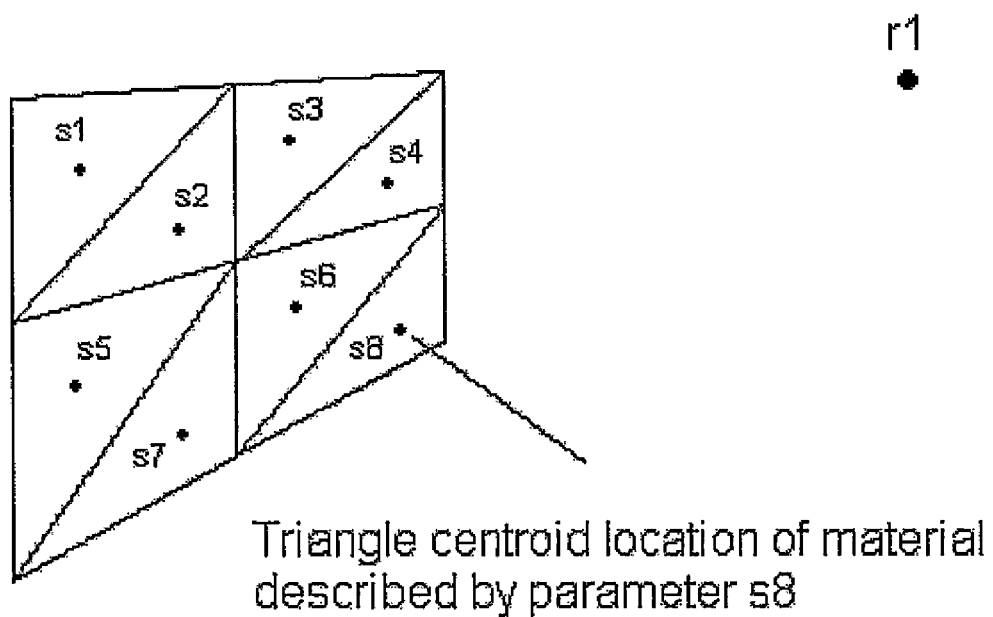
FIG. 3 shows a point source located at the centroid of each triangle, represented by parameters s.

The method described above provides a means to estimate the best set of parameters, in a particular sense, provided that the physical relationship between the each parameter and each reading can be modelled by a function $f_n(x_k, y_k, z_k)$. The derivation of these functions depends upon the adopted parameterisation, the nature of the facility, and the types of measurement made. In the present embodiment of the invention, it is assumed that the facility is a convex volume, with negligible shielding effects, and that a fixed isotopic composition with known emission spectrum $g(\lambda)$ (total counts per second per gram at a given wavelength $\lambda$) can be attributed to all source material. In the case of gamma radiation, the count rate measured at a distance d from a point source using a total counts radiation probe is approximated by:

$$c(d) = \int_o^\infty \frac{K_d e^{-\mu(\lambda)d} g(\lambda)}{d^2} \cdot d\lambda \quad \text{Eq. 6}$$

Where $K_d$ is a calibration constant that accounts for the geometry and efficiency of the detector and $\mu(\lambda)$ is the wavelength dependent attenuation coefficient of air. In practice, the emission spectrum will be zero outside of a range of interest, and the integral need only be evaluated over this range. Since the triangles of the parameterisation mesh are much smaller than the distance to the nearest source, each triangle is well modelled by a point source located at its centroid. FIG. 3 shows how the parameters refer to point source distributed over the simple surface model. The parameters then correspond to the total mass of this point source and the functions $f_n(x_k, y_k, z_k)$ are given by:

$$f_n(x_k, y_k, z_k) = c(\sqrt{(x_k - x_n)^2 + (y_k - y_n)^2 + (z_k - z_n)^2}) \quad \text{Eq. 7}$$

Where $(x_n, y_n, z_n)$ are the coordinates of the centroid of the nth triangle.

Figure 4:
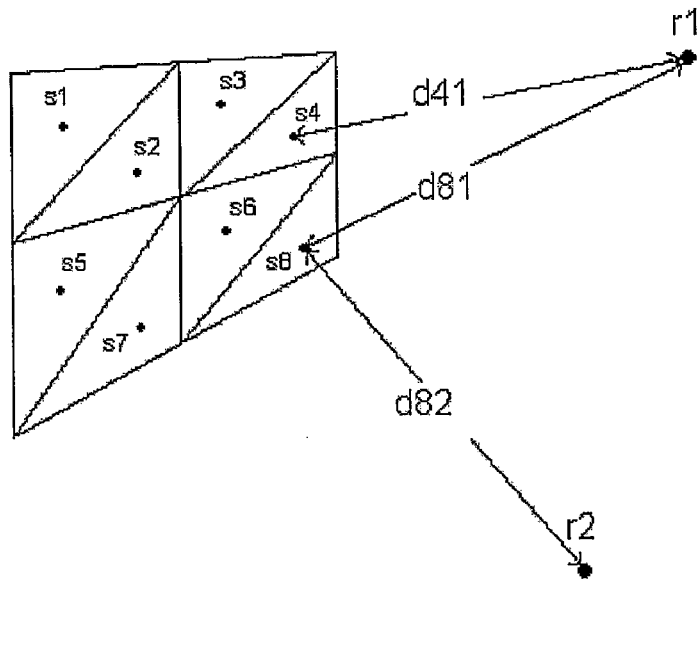
FIG. 4 shows how the matrix F and vectors S and R are defined for the illustrated source and measurement configuration, based on the assumption that attenuation in air is negligible.

To summarise, photographs are taken of a facility and for each photograph a reading is made with a gamma probe in exactly the same position. Photogrammetry is used to convert the photographs into a 3D model with known gamma reading positions. The exterior surfaces of the model are represented by N approximately equilateral triangles. The total mass of source material in the nth triangle is recorded by the parameter $s_n$. The radiation field strength at the kth measurement location due the nth parameter is given by $f_n(x_k, y_k, z_k)$ which is calculated according to equations 5 and 6 for each source and each measurement location. These values of $f_n(x_k, y_k, z_k)$ are compiled into the N×K matrix F, while the radiation measurements are compiled into the K-vector R. FIG. 4 illustrates the problem formulation process, for the case where there is no attenuation ($\mu = 0$). The pseudo inverse of F is calculated according to equation 5 and multiplied by R to obtain the parameter vector S, which specifies the estimated source distribution.

There are many ways of implementing this methodology. One such way is to use software such as Photomodeller (trademark) to translate the photographs into a 3D model. This model, along with the camera locations, may be loaded into a CAD package, such as Solidworks (trademark) to add any additional information from sources such as technical drawings or existing CAD models. The components of this model may then be output in VRML (virtual reality modelling language) and read into a mathematical package, such as Matlab (trademark) that is capable of evaluating equations 3-9. If the mesh generated by the CAD package is not fine enough, it may be manually modified in a graphics package, such as Blender. The source distribution model may then be viewed and manipulated in Matlab or exported as a VRML file to the CAD package to be incorporated into the CAD model for display. The 3D radiation field may be viewed in section view in Matlab and individual sections may be selected for export to the CAD package.

FURTHER EMBODIMENTS

Noisy Data:

Where measurements are noisy, or redundant measurements have been made resulting in a poorly conditioned system of equations the method described above may produce poor results, due to the requirement that it solve the equations exactly. To relax this requirement in a controlled manner, the following method may be used. The Singular Value Decomposition (SVD) of F is calculated:

$$F = UDV^T \quad \text{Eq. 8}$$

where D is a diagonal matrix of singular values and U and V have orthogonal, unit length columns. The pseudo inverse described in equation 5 may be replaced by:

$$F^+ = V(D^T D)^{-1} D^T U^T \quad \text{Eq. 9}$$

The effects of noise and poor conditioning can be reduced by setting small singular values (elements of D) to zero. The precise threshold is determined by the noise level. For example, if the noise is well modelled by a normal distribution with standard deviation $\sigma$ for all measurements, then $D_{ii} > \sigma$ can be used as threshold. In reality, more complex noise models may be appropriate, in which case a more sophisticated criterion can be developed, or an appropriate threshold can be identified empirically.

Non-Negative Solutions

In some cases, the previously described methods will produce, due to the effects of noise, some negative source intensities. Because negative source intensity is not physically meaningful, eliminating these from the model adds an additional constraint which can be used to improve the robustness and accuracy of the model outputs.

Several algorithms that achieve this purpose are known. Although they are typically much slower than the method described above, they have an additional advantage that less computer memory space is required, making them also suitable for application to very large models. An example of such a technique that is well suited to this application is the projected Landweber technique. This is an iterative technique, which begins with an arbitrary estimate of the source parameter vector $s^0$ and iteratively calculates an improved parameter vector $s^{k+1}$ based on the fit of the existing parameter vector $s^k$ to the model according to the following equation:

$$S^{k+1} = (S^k + \kappa F^T(R - FS^k))_+ \qquad \text{Eq 10}$$

Here κ is a step size parameter that determines the rate of convergence of the algorithm, and $(a)_+$ is the non-negative vector whose entries are those of a, where positive, and zero otherwise. This iteration loop is repeated until some stopping criterion (such as number of iterations, time, or stability of solution) is satisfied. A range of other algorithms with similar properties are also available. These include, but are not limited to: Non-negative Constrained Algebraic Reconstruction; Multiplicative Algebraic Reconstruction; Expectation Maximisation; and Ordered Subset Expectation Maximisation (OSEM).

Modelling Shielding Materials

In practice, it is often not possible to ignore the effects of shielding and still produce a meaningful radiation model. Shielding may easily be incorporated into the model, provided that material types can be assigned to the structures in the model. In the case of gamma radiation. the effects of shielding could be accounted for by replacing equation 6 with the following equation, where:

$$c(d_1, \ldots, d_l) = \int_0^\infty \frac{K_d \prod_{i=1}^{l} e^{-\mu_i(\lambda)d_i} g(\lambda)}{d^2} \cdot d\lambda \qquad \text{Eq. 11}$$

where $d_i$ is the length of the component of the line between the source and measurement points that is falls inside the ith material type, and $\mu_i(\lambda)$ is the coefficient of attenuation of the ith material type. Note that the length $d_i$ does not need to refer to a continuous length, but the total length for each material type. One way to find these lengths is to record a material for each subcomponent of the model. The intersection of the line between source and measurement points with the various material types may then be found by testing all triangles to see if the line passes through them, and, if it does, at what distance from the source this occurs. By sorting these intersection events by distance, it is possible to find the order in which the various material types are intersected and the distance between entry and exit points, thereby dividing the line into sections. Each section is associated with a material type by referring the intersected triangles back to their parent component, and sections found to be in the same material are summed to find the total distance $d_i$.

Equation 11 is an approximation to the true behaviour of radiation travelling through matter; in reality, some radiation will be scattered, meaning that a portion of its energy will be absorbed, reducing its energy (increasing its wavelength). Where a significant proportion of radiation is scattered, Equation 11 may be too inaccurate, in which case one of two approaches can be adopted.

Firstly, a more sophisticated computational model of radiation transport can be adopted. In principle any existing radiation modelling software can be used to estimate the impact of one source parameter on one or more reading locations. Such packages typically use monte carlo methods to model scattering and include, but are not limited to MNCP (trademark), MCBEND (trademark) and GEANT.

Alternatively, a gamma spectrometer can be used to take the radiation field measurements, enabling the parts of the spectrum corresponding to unscattered radiation ('photopeaks') to be measured independently of the scattered radiation. This enables Equation 11 to be applied robustly, where the integral over the full spectrum is now replaced by the integral of a photopeak, i.e. narrow bounds are used on the integral and the resulting estimate of expected counts is interpreted as the number of counts in the photopeak excluding those due to scattering from more energetic sources.

Alternative Measurement Methodologies:

The model of the facility may be obtained from "as-built" drawings, and the radiation measurements may then be located by measuring the distance of the probe from landmark features or datum points.

The model of the facility may be obtained from a 3D laser scanner, with adjacent radiation probe. 3D laser scanners scan their environment with a laser, which is used to measure the distance between the scanner and the nearest reflective surface in a particular direction. The output is a cloud of three dimensional points which can be translated into a three dimensional CAD model of the local area.

A spectral probe, e.g. a low, medium or high resolution gamma spectrometer, may be used in place of the total counts probe described above. In this case, the spectrum may be subdivided into narrow energy bands and the problem described above solved independently for each energy band, with the modification that the integral in equation 6 is taken over that energy band alone rather than the full spectrum. This results in a spectral source distribution, which could be used to estimate the isotopic fingerprint (of gamma emitters) at each point.

The invention claimed is:

1. Method of determining the distribution of radioactive material within a region comprising:
    inputting a plurality of radiological measurements and associated geometrical measurements taken at a plurality of positions in said region, wherein the radiological measurements are obtained using an un-collimated total counts radiation sensor, or an un-collimated total absorbed dose radiation sensor, or an un-collimated gamma spectrometer;
    defining a 3D model of structures within said region;
    obtaining the position within the model of each radiation measurement by using the geometrical measurements;
    ascribing the radiological measurements to a distribution of sources restricted to defined locations in the 3D model;
    parameterizing the source distribution over the defined source locations, where the number of parameters exceeds the number of radiological measurements;
    relating each parameter to the calculated observable radiation field, calculated using a physical model, at each measurement position;
    adjusting the parameters to optimize the correspondence between the actual radiological measurements and the calculated observable radiation field, to yield the distribution of radioactive material as defined by the adjusted parameters.

2. A method according to claim 1, wherein the geometrical measurements comprise photographs and the 3D model is generated from the photographs using photogrammetry.

3. A method according to claim 1, wherein each radiological measurement is obtained at a fixed spatial relationship with an associated geometrical measurement.

4. A method according to claim 1, wherein the sources are defined as being restricted to surfaces in the 3D model.

5. A method according to claim 1, wherein the source distribution is parameterized as a plurality of point sources.

6. A method according to claim 1, wherein the parameters are adjusted subject to the constraint that all sources have non-negative values.

7. A method according to claim 1, wherein the parameters are adjusted subject to the criterion that the total amount of radioactive material is minimized.

8. A method according to claim 1, wherein the physical model for calculating the observable radiation field includes the effects of shielding by materials in the 3D model between the distribution of sources and each measurement position.

9. A method according to claim 1, further comprising calculating a map of the radiation field in said region based on the distribution of radioactive material as defined by the adjusted parameters.

10. An apparatus for determining the distribution of radioactive material within a region comprising:
    a radiation measuring device;
    a geometrical measuring device; and
    a computer system, wherein the radiation measuring device and geometrical measuring device have a defined spatial relationship, wherein the radiation measuring device is an un-collimated total counts radiation sensor, or an un-collimated total absorbed dose radiation sensor, or an un-collimated gamma spectrometer, and wherein the computer system is arranged to perform the method of claim 1 using radiological measurements and associated geometrical measurements from the radiation measuring device and geometrical measuring device.

11. An apparatus according to claim 10, wherein the geometrical measuring device comprises a camera or laser scanner.

12. An apparatus according to claim 10, wherein the radiation measuring device and the geometrical measuring device are mounted together.

13. A computer program comprising computer-executable code that when executed on a computer system causes the computer system to perform a method according to claim 1.

14. A computer-readable medium storing a computer program according to claim 13.

15. A computer system arranged to perform a method according to claim 1.

* * * * *